United States Patent
Park et al.

(10) Patent No.: US 12,233,557 B2
(45) Date of Patent: Feb. 25, 2025

(54) METHOD AND SYSTEM FOR INITIALIZATION DIAGNOSIS OF MOBILE ROBOT

(71) Applicants: YUJIN ROBOT CO., LTD., Incheon (KR); Miele & Cie. KG, Gütersloh (DE)

(72) Inventors: Seong Ju Park, Gunpo-si (KR); Jae Young Lee, Gunpo-si (KR)

(73) Assignees: YUJIN ROBOT CO., LTD., Incheon (KR); Miele & Cie. KG, Gütersloh (DE)

( * ) Notice: Subject to any disclaimer, the term of this patent is extended or adjusted under 35 U.S.C. 154(b) by 470 days.

(21) Appl. No.: 17/603,770

(22) PCT Filed: Apr. 16, 2020

(86) PCT No.: PCT/KR2020/005097
§ 371 (c)(1),
(2) Date: Oct. 14, 2021

(87) PCT Pub. No.: WO2020/213955
PCT Pub. Date: Oct. 22, 2020

(65) Prior Publication Data
US 2022/0184811 A1    Jun. 16, 2022

(30) Foreign Application Priority Data
Apr. 16, 2019   (KR) .......................... 10-2019-0044379

(51) Int. Cl.
*B25J 9/16*    (2006.01)
*B25J 19/02*    (2006.01)

(52) U.S. Cl.
CPC ........... *B25J 9/1674* (2013.01); *B25J 9/1692* (2013.01); *B25J 9/1697* (2013.01); *B25J 19/02* (2013.01); *B25J 19/022* (2013.01); *B25J 19/023* (2013.01)

(58) Field of Classification Search
CPC ...... B25J 9/1674; B25J 9/1692; B25J 9/1697; B25J 19/02; B25J 19/022; B25J 19/023;
(Continued)

(56) References Cited

U.S. PATENT DOCUMENTS

| | | | |
|---|---|---|---|
| 11,858,128 B1* | 1/2024 | Ng | B25J 9/0009 |
| 2013/0025085 A1* | 1/2013 | Kim | A47L 9/2889 |
| | | | 700/258 |

(Continued)

FOREIGN PATENT DOCUMENTS

| | | | |
|---|---|---|---|
| KR | 1020060032305 A | 4/2006 | |
| KR | 100886340 B1 | 3/2009 | |

(Continued)

*Primary Examiner* — Sohana Tanju Khayer
(74) *Attorney, Agent, or Firm* — BROADVIEW IP LAW, PC

(57) ABSTRACT

The present invention provides a method and a system for initialization diagnosis of a mobile robot. The present invention comprises the steps, executed by at least one processor included in a mobile robot, of executing an initialization diagnosis command to cause an initialization operation to be performed, the initialization operation being necessary to determine an initialization quality when a diagnosis target module transitions from an idle state to a wake-up state; receiving diagnosis acquisition information including a response according to the initialization diagnosis command in the wake-up state of the diagnosis target module; and, by using a task mission to be performed by the mobile robot and the diagnosis acquisition information, calculating an initialization quality evaluation result value indicating the initial- (Continued)

ization quality of the diagnosis target module, and executing a response operation according to the initialization quality evaluation result value.

15 Claims, 14 Drawing Sheets

(58) Field of Classification Search
CPC .......... G01S 7/497; G01S 17/88; G01S 17/89; G01S 17/931; G05D 1/0234; G05D 1/024; G05D 1/027
See application file for complete search history.

(56) References Cited

U.S. PATENT DOCUMENTS

| | | |
|---|---|---|
| 2013/0325252 A1 | 12/2013 | Schommer et al. |
| 2016/0144512 A1* | 5/2016 | Kim ...................... B25J 9/1674 348/46 |
| 2016/0298970 A1* | 10/2016 | Lindhe ................. G01C 21/206 |
| 2017/0045025 A1* | 2/2017 | Nakayama .............. F02P 15/10 |
| 2017/0153646 A1* | 6/2017 | Shin ...................... G06V 10/507 |
| 2018/0149753 A1* | 5/2018 | Shin ........................ G01S 7/4811 |
| 2018/0188043 A1* | 7/2018 | Chen .......................... G06T 7/11 |
| 2018/0287519 A1* | 10/2018 | Ishida ....................... B60T 8/00 |
| 2018/0333868 A1* | 11/2018 | Tanaka ................. B25J 19/0095 |
| 2019/0120158 A1* | 4/2019 | Komeno ................ F02M 26/49 |
| 2019/0187717 A1* | 6/2019 | He ........................ A47L 9/0477 |
| 2020/0073401 A1* | 3/2020 | Szatmary .................. B60T 7/00 |
| 2020/0292600 A1* | 9/2020 | Kurachi .................. H03K 17/955 |
| 2020/0292601 A1* | 9/2020 | Kurachi ............. G01R 27/2605 |
| 2020/0331148 A1* | 10/2020 | Zhang ................... B25J 13/089 |

FOREIGN PATENT DOCUMENTS

| | | | |
|---|---|---|---|
| KR | 101324166 B1 | | 11/2013 |
| KR | 101356220 | * | 1/2014 |
| KR | 1020170006393 A | | 1/2017 |

* cited by examiner (a)

(b)

(a)Zero piching case  (b)Non zero pitching case (a)

```
{
  "motor_test" : {
    "Date" : "2020_03_26_08:05:01",
    "Items" : [
      {
        "Item_name" : "Current_0",
        "Status" : "OK",
        "Value_Avg" : 0,
        "Value_Max" : -0.0060000000521540642,
        "Value_Min" : -0.0060000000521540642
      },
      {
        "Item_name" : "Voltage_0",
        "Status" : "OK",
        "Value_Avg" : 0,
        "Value_Max" : 0,
        "Value_Min" : 0
      },
      {
        "Item_name" : "Driver temp_0",
        "Status" : "OK",
        "Value_Avg" : 26,
        "Value_Max" : 26,
        "Value_Min" : 26
      },
      {
        "Item_name" : "Motor temp_0",
        "Status" : "OK",
        "Value_Avg" : 21,
        "Value_Max" : 21,
        "Value_Min" : 21
      }
    ]
  }
}
```

FIG. 14

```
{
  "ping_test" : {
    "Date" : "2020_03_26_08:04:51",
    "Items" : [
      {
        "Item_name" : "DSlam",
        "Status" : "Fail"
      },
      {
        "Item_name" : "Master",
        "Status" : "OK"
      },
      {
        "Item_name" : "Sick_01",
        "Status" : "OK"
      },
      {
        "Item_name" : "Sick_02",
        "Status" : "OK"
      }
    ]
  }
}
```

METHOD AND SYSTEM FOR INITIALIZATION DIAGNOSIS OF MOBILE ROBOT

TECHNICAL FIELD

The present invention relates to a method for diagnosing and correcting an initialization state of a mobile robot, and more particularly, to a method and a system for diagnosis and correction with regard to initialization of a state when a mobile robot is in a wake-up state.

BACKGROUND ART

When the mobile robot starts an operation from an idle state or a charging state, parameters related to the operation of the mobile robot need to be initialized to perform a normal operation of the mobile robot.

Various methods for initialization of an operation of the mobile robot have been known, but an initialization method enough to stably perform a cleaning operation without causing an erroneous operation of the cleaning operation of the cleaning robot has not been known yet.

DISCLOSURE

Technical Problem

An object of the present invention is to provide a method and a system for diagnosing initialization of a mobile robot to diagnose initial states of various resources which need to be considered in a wake-up state of the mobile robot and correct an initialization value in real time to allow the mobile robot to stably run and operate, in consideration of a limitation of the related art.

Technical Solution

In order to achieve the above-described object of the present invention, an initialization diagnosis method of a mobile robot according to the present invention includes: allowing at least one processor included in the mobile robot to execute an initialization diagnosis command to perform an initialization operation necessary to determine an initialization quality when a diagnosis target module transitions from an idle state to a wake-up state; receiving diagnosis acquisition information including a response according to the initialization diagnosis command in a wake-up state of the diagnosis target module; and calculating an initialization quality evaluation result value representing the initialization quality of the diagnosis target module using a task mission to be performed by the mobile robot and the diagnosis acquisition information and executing a response operation according to the initialization quality evaluation result value.

Here, the state transition of the diagnosis target module is performed within a predetermined distance from the base station where the mobile robot is charged or the mobile robot stops in the idle state to be located and the initialization quality is related to erroneous operation causing factors which may correct driving factors related to the autonomous driving of the mobile robot or cause the erroneous operation of the mobile robot.

Here, the base station includes an initialization diagnosis marker including a reflector which reflects at least some of incident optical signals again to be identifiable by a camera module or a Lidar module and by an operation of acquiring images of the base station or surroundings of the base station according to the initialization diagnosis command, an image including the initialization diagnosis marker attached to the base station is acquired.

Here, the diagnosis target module is a camera module and a command to cause the initialization operation to be performed in the exemplary embodiment of the present invention includes a first command related to an operation to cause the mobile robot to at least temporally depart from the base station and a second command related to an operation to acquire an image of the base station or an image of the surrounding of the base station in a departing state according to the first command and the processor predicts a pose of the camera module by image analysis on the image acquired according to the second command.

Here, the diagnosis target module is a Lidar module and a command to cause the initialization operation to be performed includes a first command related to an operation to cause the mobile robot to at least temporally depart from the base station and a second command related to an operation to allow the Lidar module to irradiate beam vertically or horizontally to the base station and receive the reflected beam in a departing state according to the first command and the processor predicts a pitching angle of the Lidar module by means of the analysis on the Lidar image acquired according to the second command.

Here, when the pitching angle of the Lidar module is predicted by analyzing the Lidar image acquired according to the second command, a beam reflected by the reflector according to the second command is received to measure the distance and the intensity from the initialization diagnosis marker to receive the distance and the intensity as the diagnosis acquisition information and the pitching angle is predicted with the initialization quality evaluation result value based on the distance and the intensity.

Here, the diagnosis target module is the inertia measurement unit (IMU) which measures the accelerate of the mobile robot, a command to cause the initialization operation to be performed includes a first command related to an operation of allowing the mobile robot to at least temporally depart from the base station and a second command related to an operation of performing an operation according to the first command and receiving a measured acceleration value from the inertial measurement unit (IMU) module as the diagnosis acquisition information, and the processor calculates a deviation obtained by comparing the measured acceleration value received according to the second command and a predetermined acceleration reference value as the initialization quality evaluation result value to determine the failure of the signal.

Here, the diagnosis target module is the inertia measurement unit (IMU) module which measures the accelerate of the mobile robot, a command to cause the initialization operation to be performed includes a first command related to an operation of allowing the mobile robot to at least temporally depart from the base station and a second command related to an operation of receiving a measured relative angle value measured by rotating the camera module or the Lidar module in a predetermined direction in a departing state according to the first command as the diagnosis acquisition information, and the processor calculates an error obtained by comparing the measured relative angle value received according to the second command and a predetermined relative angle reference value as the initialization quality evaluation result value to determine the failure of the signal.

Here, when the response operation according to the initialization quality evaluation result value is performed, the processor calculates a deviation obtained by comparing a measured acceleration value received according to the second command and a predetermined acceleration reference value as the initialization quality evaluation result value and at this time, when a signal is normal, corrects the acceleration reference value with the measured acceleration value.

Here, when the response operation according to the initialization quality evaluation result value is executed, the processor calculates an error obtained by a measured relative angle value received according to the second command and the predetermined relative angle reference value as the initialization quality evaluation result value to inversely calculate the scale factor for reducing the error to correct the error.

An initialization diagnosis system of a mobile robot according to the present invention includes: a base station in which the mobile robot is charged or the mobile robot stops in an idle state to be located; a passive initialization reference providing unit which is located in the base station and provides a reference for initializing the mobile robot; and an initialization diagnosis processor which generates an initialization diagnosis command to perform an initialization operation required to determine an initialization quality according to a state transition of the diagnosis target module included in the mobile robot from an idle state to a wake-up state, receives diagnosis acquisition information including a respond according to the initialization diagnosis command in a wake-up state of the diagnosis target module, calculates the initialization quality result value indicating an initialization quality of the diagnosis target module using a task mission to be performed by the mobile robot and the diagnosis acquisition information, and executes the response operation according to the initialization quality evaluation result value.

Here, the passive initialization reference providing unit includes: i) an initialization diagnosis marker which is identifiable by a camera module or a Lidar module equipped in the mobile robot facing the base station; or ii) a marker which is identifiable by the camera module or the Lidar module equipped in the mobile robot facing the base station; and an initialization reference wheel plate which is located such that a wheel of the mobile robot is in contact therewith to allow the mobile robot to recognize the marker while the mobile robot moves.

Here, the initialization diagnosis marker further includes a reflector which reflects at least some of incident optical signals again and the reflector has a pattern in a direction corresponding to a horizontal operation direction of the camera module or the Lidar module equipped in the mobile robot.

Here, the initialization diagnosis maker further includes a reflector having a property of reflecting at least some of incident optical signals again and the reflector is recognized by the camera module or the Lidar module equipped in the mobile robot and is disposed so as to be differently recognized according to a three-dimensional positional relationship with the mobile robot.

Here, the diagnosis target module is a Lidar module and a command to cause the initialization operation to be performed includes a first command related to an operation to cause the mobile robot to at least temporally depart from the base station and a second command related to an operation to allow the Lidar module to irradiate beam vertically or horizontally to the base station and receive the reflected beam in a departing state according to the first command and the initialization diagnosis processor predicts a pitching angle of the Lidar module by means of the analysis of the Lidar image acquired according to the second command.

Advantageous Effects

According to the method and the system for diagnosing initialization of a mobile robot of the present invention, when the mobile robot transitions a state from a stop state or an idle state to a wake-up state, states of various resources, a camera pitching angle, and a pitching angle of a Lidar sensor are precisely diagnosed to correct an initial value of a parameter related to the initialization of various resources or easily correct sensor values acquired by a sensor. By doing this, it is possible to stably run the mobile robot or implement a working process.

DESCRIPTION OF DRAWINGS

FIGS. 12 to 14 illustrate a failure diagnosis method of a mobile robot using an integrated UI, according to an exemplary embodiment of the present invention.

BEST MODE

Figure 1:
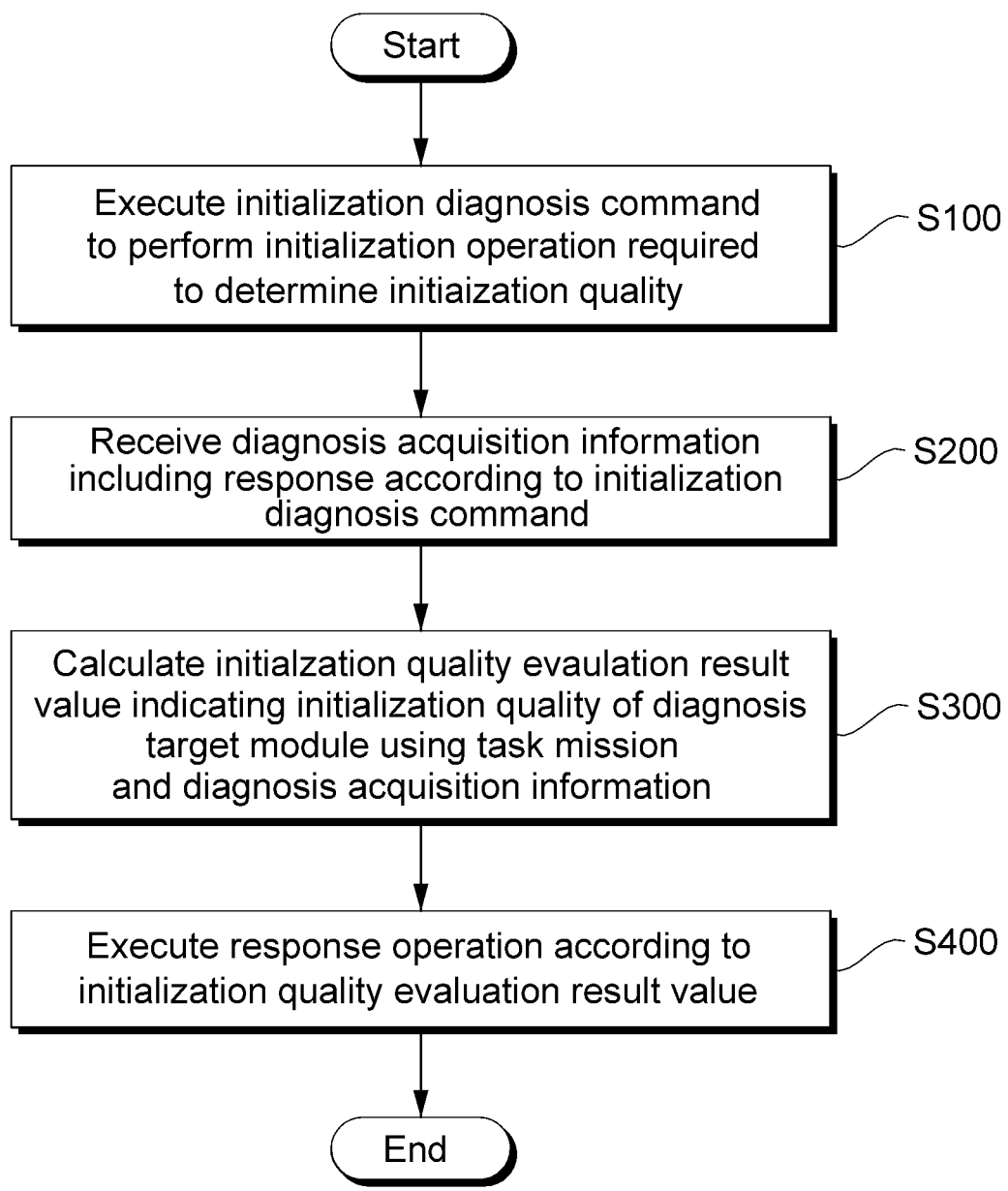
FIG. 1 is a flowchart illustrating an initialization diagnosis method of a mobile robot according to an exemplary embodiment of the present invention.

Hereinafter, embodiments of the present disclosure will be described in detail with reference to the accompanying drawings. Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

Terms used in the present application are just used to describe a specific exemplary embodiment and do not intend to limit the present invention and a singular expression may include a plural expression as long as it is not apparently contextually different. In the present application, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

FIG. 1 is a flowchart illustrating an initialization diagnosis method of a mobile robot according to an exemplary embodiment of the present invention. The initialization diagnosis method of FIG. 1 includes following steps which is time-sequentially performed by a processor 10 illustrated in FIG. 5.

Here, a mobile robot refers to a robot which is at least partially autonomously driven, such as a household cleaning robot, a building cleaning robot, a logistics robot, and a service robot and a type of a mobile robot is not specifically limited. For example, the cleaning robot may be implemented to include various modules such as a housing, bumper, a wheel assembly module, a suction module, a proximity sensor, a camera, a Lidar, a dust bin, a main brush, a side brush, a power source, a processor, and a memory.

In the exemplary embodiment, input/output devices may have errors caused due to external physical shocks or their own deterioration. In the exemplary embodiment, it is diagnosed whether the initialization of the input/output devices is proper. A diagnosis target module which is a target to diagnose the initialization is mounted in the mobile robot to be independently detachable or to be disassembled to be detachable.

The diagnosis target module may include a communication module, a camera module, a Lidar module, a proximity sensor, a cliff sensor, or an IMU sensor. Such modules are implemented to be directly connected to a processor in the mobile robot or to be connected to the processor via an I/O interface. All the above-described modules are input/output devices to acquire environment information about an external environment. The processor depends on the environment information acquired by the input/output device to perform an operation to predict a current situation of the mobile robot. For example, the processor receives an external message which is received from a docking state by means of the communication module or predicts a current location or a current situation of the mobile robot by means of an image acquired from the camera module. Further, the processor may know whether to be proximate to an external object or an obstacle by means of the proximity sensor. The processor of the mobile robot predicts the current situation based on the environment information and performs a working operation in consideration of the predicted situation. Therefore, when an error of the environment information is larger than a limit or the error is accumulated, the current situation may be erroneously predicted. The present exemplary embodiment proposes a method of diagnosing whether the input/output devices normally operate and correcting the environment information if necessary.

Further, in the present invention, "wake-up" means that the mobile robot is in a stand-by state in a station and then changes a state to move for a necessary work. In this case, in order to stably perform the operation of the mobile robot and prevent an erroneous operation, it is necessary to diagnose a failure in an initial state or correct the failure if necessary. The initialization may include diagnosis or correction of an initial state of various sensors included in the cleaning robot.

As described above, when the robot does not move, and then wakes-up, it is important to precisely diagnose the initialization before performing the operation. There are various causes of the idle state in which the robot does not move. For example, when the mobile robot is charged in a base station or a charging station, the mobile robot is in a stand-by state after completing a necessary operation, or the mobile robot returns to the station due to the failure or after the failure occurs, the mobile robot in in the idle state. After transitioning this state to the wake-up state, before performing an actual operation, the stable operation may be performed according to the method proposed by the present invention.

In step S100, at least one processor included in the mobile robot executes an initialization diagnosis command to perform an initialization operation necessary to determine an initialization quality when a diagnosis target module transitions from an idle state to a wake-up state.

The idle state refers to a state in which the mobile robot is fixed to the base station or stops in a location other than the base station without moving. The wake-up state refers to a state in which the mobile robot performs a task or moves to perform a task. The state transition refers that the state of the mobile robot changes from the idle state to the wake-up state.

The diagnosis for various input/output devices are also performed while performing the task of the mobile robot. However, when an electric energy necessary for the task is considered, it is more desirable to perform the initialization diagnosis operation for the input/output devices within a time close to a time when the state transition occurs and in a location within a distance close to the docking station.

In step S200, the processor 10 receives diagnosis acquisition information including a response according to the initialization diagnosis command in the wake-up state of the diagnosis target module. For example, when the initialization diagnosis command allows the camera module to acquire an image of a front surface, the response means the acquired image. The diagnosis acquisition information includes the acquired image itself and additional information added to the image. Further, when there is a separate image processing processor for image processing, the diagnosis acquisition information may include an output from the image processing processor. In this case, the output includes information about an object recognized from the image, pixel value information of the image, and information about a representative value (for example, an average of pixel values or a feature value for an edge) for every divided block when the image is recognized as a plurality of divided blocks.

In step S300, the processor 10 calculates an initialization quality evaluation result value indicating the initialization quality of the diagnosis target module using a task mission to be performed by the mobile robot and the diagnosis acquisition information and executes a response operation according to the initialization quality evaluation result value.

When the mobile robot is a cleaning robot, the task mission may be a mission for performing a cleaning task. When the mobile robot is a service robot, the task mission may be a mission for moving to a destination to perform a service operation.

The initialization quality refers to a degree of a capability of the diagnosis target module which exhibits a unique environment sensing capability by means of the diagnosis acquisition information. The processor calculates the initialization quality evaluation result value according to a predetermined algorithm, using the diagnosis acquisition information and predetermined reference information as inputs. For example, the initialization quality evaluation result value may be obtained by calculating a difference between a measurement value obtained from the initialization diagnosis result and an ideal reference value which needs to be obtained in a state in which no error exists or a relative ratio. The method of calculating the initialization quality evaluation result value vary depending on a type of the diagnosis target module so that it will be described in more detail for every module.

In step S400, a response operation according to the initialization quality evaluation result value is executed. Here, the response operation includes an operation of correcting a reference value of the diagnosis target module or correcting a scale factor to reduce an error.

A step of performing a diagnosis operation of the diagnosis target module and a method of diagnosing the initialization state will be described in more detail with reference to FIGS. 2 to 14.

Figure 2:
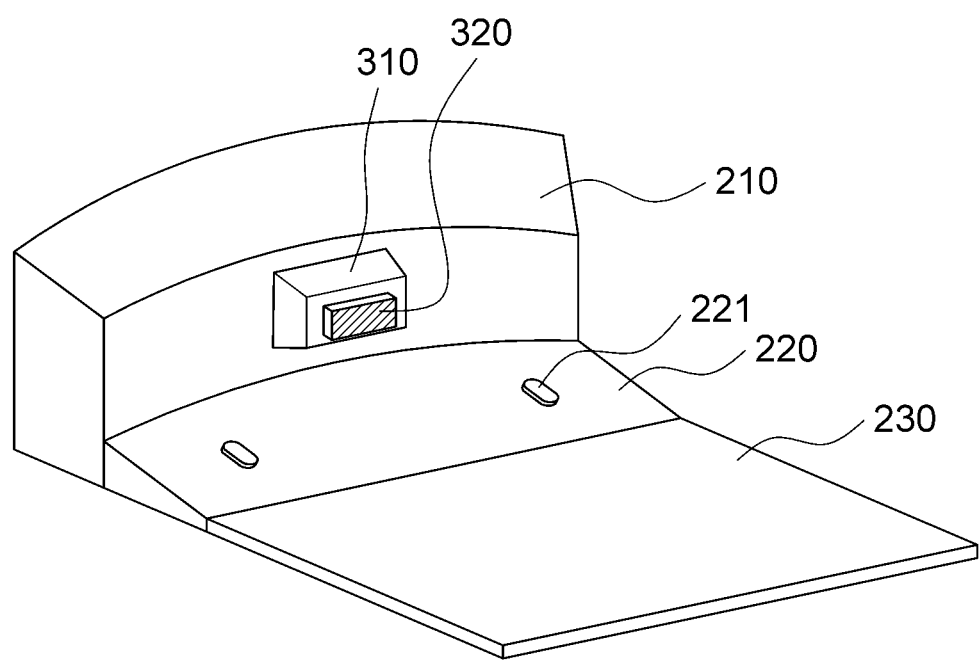
FIGS. 2 and 3 are views illustrating an initialization diagnosis system of a mobile robot according to an exemplary embodiment of the present invention.
Figure 3:
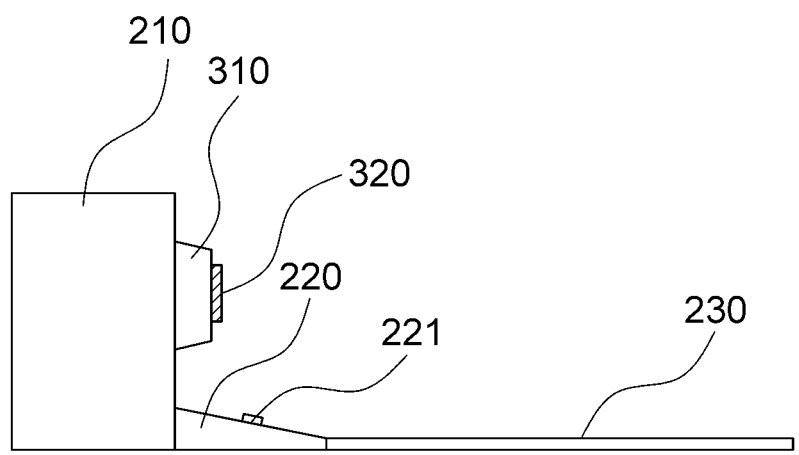

FIGS. 2 and 3 are views illustrating an initialization diagnosis system of a mobile robot according to an exemplary embodiment of the present invention.

Referring to FIGS. 2 and 3, the initialization diagnosis system of a mobile robot according to the exemplary embodiment of the present invention includes a base station and an initialization diagnosis processor.

The base station 210 refers to a docking state in which the mobile robot is charged or the mobile robot stops in the idle state to be located.

A passive initialization reference providing unit is located in the base station and provides a reference for initializing the mobile robot.

The initialization diagnosis processor generates an initialization diagnosis command to perform an initialization operation required to determine an initialization quality according to a state transition of the diagnosis target module included in the mobile robot from an idle state to a wake-up state, receives diagnosis acquisition information including a respond according to the initialization diagnosis command in a wake-up state of the diagnosis target module, calculates the initialization quality result value indicating an initialization quality of the diagnosis target module using a task mission to be performed by the mobile robot and the diagnosis acquisition information, and executes the response operation according to the initialization quality evaluation result value.

The passive initialization reference providing unit includes an initialization diagnosis marker 310 which is identifiable by a camera module or a Lidar module equipped in the mobile robot facing the base station or a marker which is identifiable by the camera module or the Lidar module equipped in the mobile robot facing the base station and an initialization reference wheel plate 220 which is located to be contact with a wheel of the mobile robot to allow the mobile robot to recognize the marker while the mobile robot moves.

A terminal 221 is provided in the wheel plate 220 so that when the wheel of the mobile robot is in contact therewith, the charging is started. Further, the wheel plate 220 is provided to extend a seating plate 230 in which the mobile robot is seated. The seating plate 230 has a size allowing all the wheels of the mobile robot to be located in parallel on the seating plate when the mobile robot moves back from the base station to diagnose the initialization. For example, when the mobile robot is a cleaning robot, a size of the seating plate 230 is desirably implemented such that casting wheels located at a front side and main wheels located at a rear side are located on the seating plate 230. The initialization diagnosis marker 310 further includes a reflector 320 having a property of reflecting at least some of incident optical signals again. The reflector is recognized by the camera module or the Lidar module equipped in the mobile robot. The reflector is disposed so as to be differently recognized according to a three-dimensional positional relationship with the mobile robot. For example, a housing of the base station is provided such that a surface on which a retro-reflective film is attached forwardly protrudes rather than flatly attaching the retro-reflective film on the base station to form the three-dimensional positional relationship with the mobile robot. By doing this, the pitching angle of the camera is also known.

Figure 4:
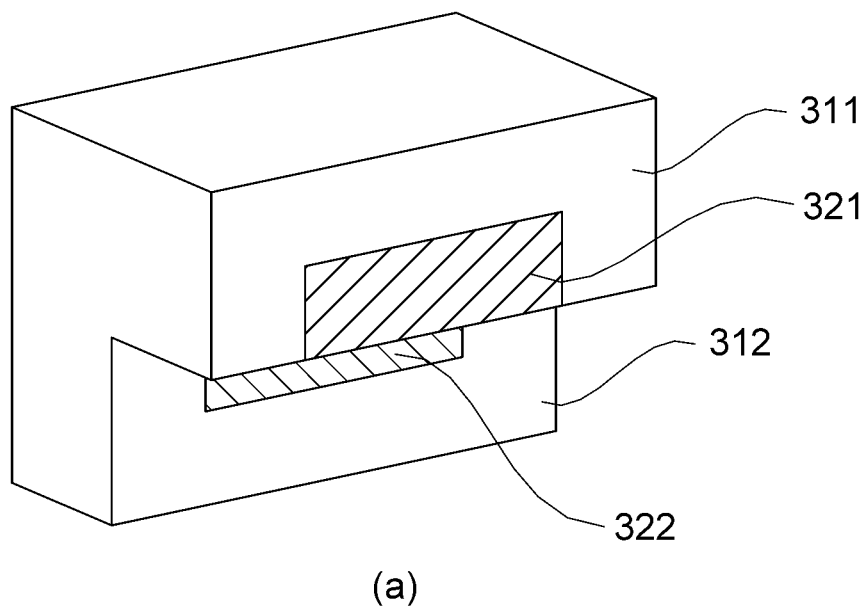
FIG. 4 is a view illustrating an initialization diagnosis marker of an initialization diagnosis system of a mobile robot according to various exemplary embodiments of the present invention.
Figure 4:
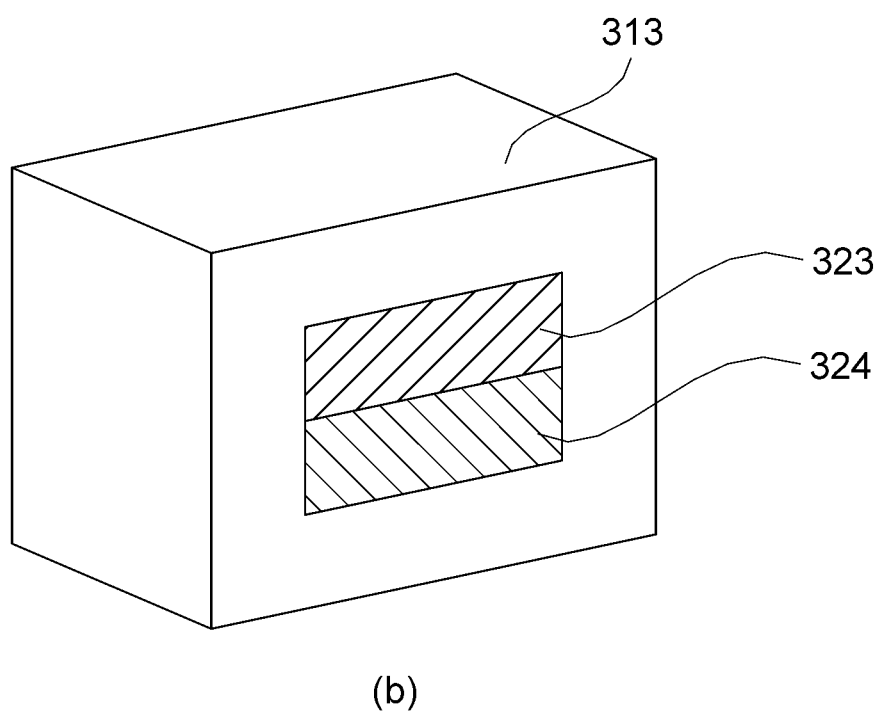

FIG. 4 is a view illustrating an initialization diagnosis marker of an initialization diagnosis system of a mobile robot according to various exemplary embodiments of the present invention.

According to various exemplary embodiments of the present invention, the initialization diagnosis marker of the initialization diagnosis system of the mobile robot may be implemented by various types of blocks.

As illustrated in FIG. 4(a), the initialization diagnosis marker is designed as a block having an "L" shape or a reversed "L" shape.

A first protrusion 311 includes a first reflector 321 and a second protrusion 312 is attached with a second reflector 322 so that as the block is seen from the front side, like the initialization diagnosis marker illustrated in FIG. 2, the Lidar acquires a signal as if an optical signal is reflected from one reflector. When an angle of the Lidar is deviated, divided signals from the first reflector and the second reflector are received so that a gradient of the Lidar module may be predicted. Further, a third reflector is further attached at a lower end of the first protrusion 311, so that when the angle of the Lidar is deviated, another reflective signal is received to predict the gradient.

As illustrated in FIG. 4(b), the initialization diagnosis marker includes two different types of reflectors.

The first reflector 323 and the second reflector 324 which reflect a light source in different ways are disposed up and down on the same plane of one block 313.

The Lidar of the mobile robot receives two different light sources according to the first reflector and the second reflector to calculate a gradient according to a first light source and a gradient according to a second light source to check the gradient twice. Therefore, the initialization may be more precisely diagnosed.

Figure 5:
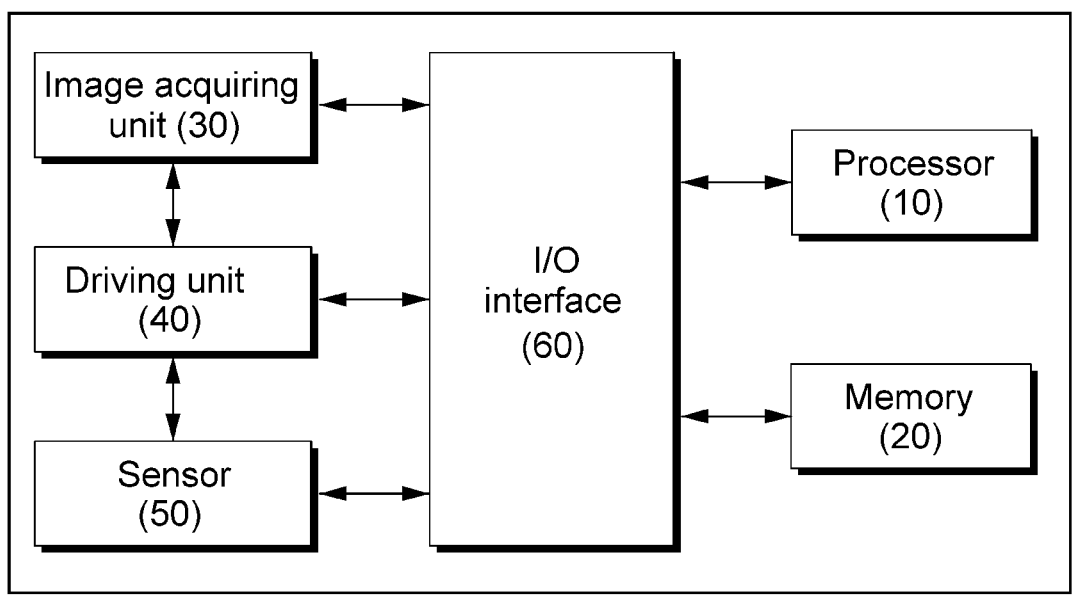
FIG. 5 is a block diagram illustrating an initialization diagnosis system of a mobile robot according to an exemplary embodiment of the present invention.

FIG. 5 is a block diagram illustrating an initialization diagnosis system of a mobile robot according to an exemplary embodiment of the present invention.

Referring to FIG. 5, the initialization diagnosis system of a mobile robot according to the exemplary embodiment of the present invention includes a first processor 10, a memory 20, an image acquiring unit 30, a driving unit 40, a sensor unit 50, and an I/O interface 60.

The initialization diagnosis system of a mobile robot according to the exemplary embodiment of the present invention is a device which initializes the mobile robot when the mobile robot is in a wake-up state.

The processor 10 executes one or more commands stored in the memory 20.

Specifically, the processor 10 performs steps of executing an initialization diagnosis command to perform an initialization operation required to determine an initialization quality according to a state transition of the diagnosis target module included in the mobile robot from an idle state to a wake-up state, receiving diagnosis acquisition information including a response according to the initialization diagnosis command in a wake-up state of the diagnosis target module, calculating the initialization quality result value indicating an initialization quality of the diagnosis target module using a task mission to be performed by the mobile robot and the diagnosis acquisition information, and executing a response operation according to the initialization quality evaluation result value.

Here, the state transition of the diagnosis target module is performed within a predetermined distance from the base station where the mobile robot is charged or the mobile robot stops in the idle state to be located and the initialization quality is related to erroneous operation causing factors which may correct driving factors related to the autonomous driving of the mobile robot or cause the erroneous operation of the mobile robot.

Here, the driving factor is related to the autonomous driving of the mobile robot and includes an angle of the camera, a pitching angle of the Lidar, an angular velocity measured from an inertia measurement unit, an acceleration, and a relative angle of the mobile robot.

Further, the erroneous operation causing factor is related to an element which causes an erroneous operation of the mobile robot and includes a current flowing through a motor and a short-circuit situation of a sensor.

According to the exemplary embodiment, a current flowing through a motor when the mobile robot is driven is detected to prevent an erroneous operation according to the occurrence of the over-current and check the short-circuit of the sensor to identify the failure state of the sensor.

The diagnosis target module refers to modules included in the mobile robot and, in the present invention, includes a communication module, a camera, a Lidar sensor, a cliff sensor, a distance sensor, a motor, an inertia measurement unit (IMU), and a battery.

The memory 20 stores one or more commands and the commands include a command to cause the initialization operation to be performed.

For example, when the diagnosis target module is a camera module, a command to cause the initialization operation to be performed in the exemplary embodiment of the present invention includes a first command related to an operation to cause the mobile robot to at least temporally depart from the base station and a second command related to an operation to acquire an image of the base station or an image of the surrounding of the base station in a departing state according to the first command. The processor predicts a pose of the camera module by image analysis for the image acquired according to the second command.

When the diagnosis target module is a Lidar module, the command to cause the initialization operation to be performed includes a first command related to an operation to cause the mobile robot to at least temporally depart from the base station and a second command related to an operation to allow the Lidar module to irradiate beam vertically or horizontally to the base station and receive the reflected beam in a departing state according to the first command. The processor predicts a pitching angle of the Lidar module by means of the analysis of the Lidar image acquired according to the second command.

The image acquiring unit 30 is attached to the mobile robot to acquire the image of the base station or images of surroundings of the base station. The images of the surroundings are acquired using a camera and in the present invention, when the failure is diagnosed, an inclination degree is identified by the camera and a quality of the image is diagnosed.

The image acquiring unit may be implemented by one camera or separately added to acquire images or used to diagnose the other diagnosis module.

The driving unit 40 is a module used to drive the mobile robot and includes a motor and a wheel. In the present invention, an electrical signal of the motor is detected to diagnose the failure.

The sensor unit 50 senses a surrounding environment and a physical change of the mobile robot and includes a Lidar sensor, a cliff sensor, a distance sensor, and an inertia measurement unit (IMU).

In the present invention, a measurement value of the sensor and a set threshold value are compared to diagnose the failure and a scale factor is adjusted to correct the error of the scale factor.

The I/O interface 60 is a device which mounts a connection medium to connect a system or equipment and in the present invention, connects the image acquiring unit, the driving unit, and the sensor unit with the processor.

Even though it is necessary for the mobile robot to correct and diagnose in real time, in some times, when there is no absolute reference value for correction/diagnosis, problems may occur in the mobile robot in some times. Therefore, it is desirable to perform initial correction/diagnosis with an absolute reference value system. In this case, as the absolute reference value, a docking station for charging the mobile robot may be considered.

Before performing the operation of the mobile robot, parameters of many modules, specifically, parameters related to the initialization are desirably corrected.

Resources or matters required to be corrected or diagnosed are exemplified as follows:
  1) Cliff sensor
  2) Attitudes—mainly pitching angle of mobile platform
  3) Motors
  4) Battery
  5) Camera attitudes In the present invention, a diagnosis target module or a correction target parameter to be diagnosed as one component of the mobile robot is not limited to those described above. The mobile robot, specifically, it is not easy for the cleaning robot to acquire the absolute reference value in real time. It is desirable to acquire the absolute reference value using an already known structure such as the base station.

The mobile robot of the present invention is provided to all or selectively include a mobile platform which defines an appearance of the robot and supports the entire structure, a main processor which controls an operation of the mobile robot, determines a situation, and generates a necessary command, a wheel which performs an operation for movement, a camera which acquires images, a cliff sensor which measures a distance from a cliff/floor, a Lidar sensor, an IR sensor, and other environment sensors. Hereinafter, every parameter or operation of the main modules which perform correction and diagnosis with regard to the initialization will be described in more detail.

[Ethernet IP Assignment]

A communication unit among the diagnosis target modules included in the mobile robot in the present invention is diagnosed, which corresponds to the most basic diagnosis.

The processor confirms packet internet groper (Ping) after notifying the assigned Ethernet IP, and confirms a communication state with a hardware by the Ping command.

Here, the picket Internet groper (Ping) is a program to retrieve whether an IP datagram reaches the other host.

The Ping is an application program which uses a TCP/IP protocol and checks whether the IP datagram reaches the other host. A program which performs the Ping sends a message of an ICMP echo request to a remote host and then waits for a reply. When the host that receives the transmitted ICMP echo request is working, the host may send the reply, but when the host does not work, the host does not send the reply. As described above, depending on whether the ICMP echo reply returns, it is possible to check whether the remote host is working.

IPs assigned to a DSLAM board, a master board, and a sick board are checked and when a set condition is satisfied, it is considered that there is no problem in the Ethernet connection. Here, the set condition is a response speed of 10 ms or slower and three successes in three attempts.

[Prediction of Pitching Angle of Camera]

Figure 6:
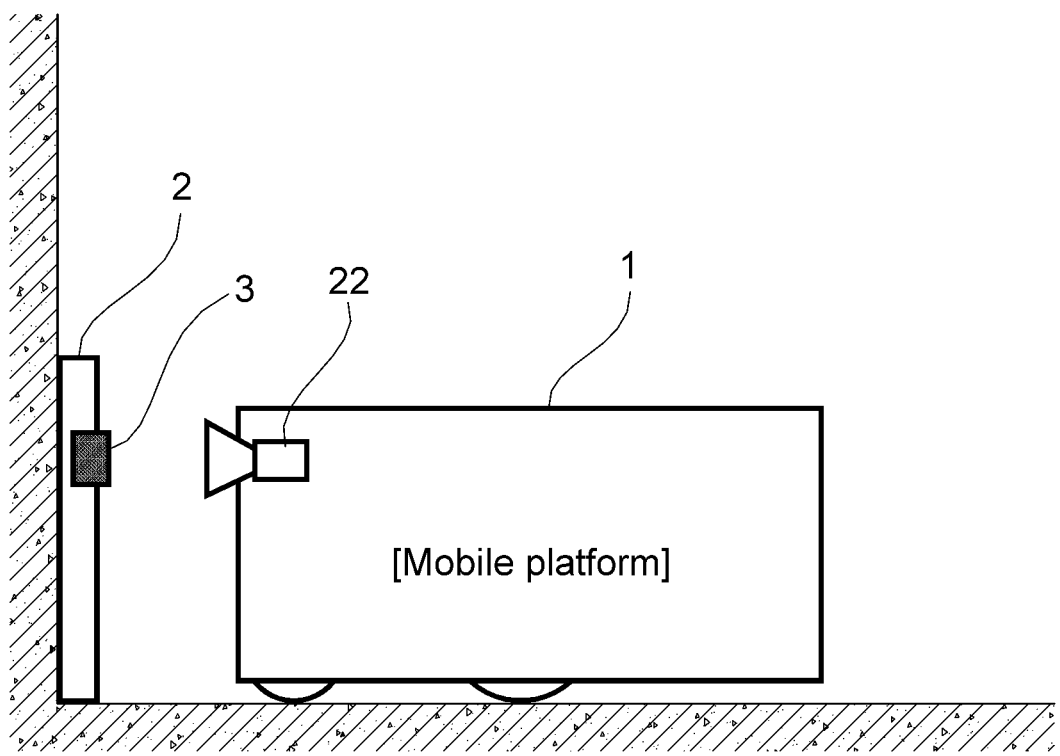
FIGS. 6 and 7 illustrate an example of predicting a camera pitching angle of a mobile robot, according to an exemplary embodiment of the present invention.
Figure 7:
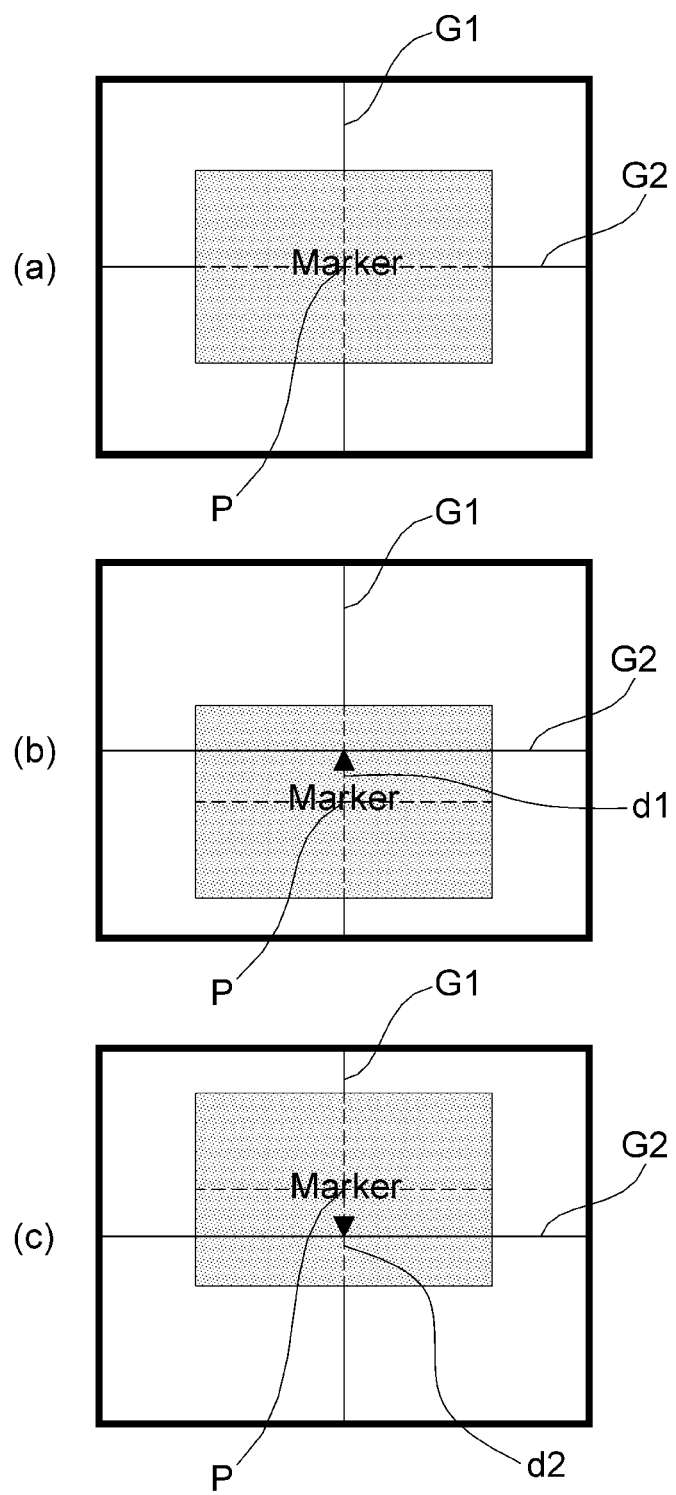

FIGS. 6 and 7 illustrate an example of predicting a camera pitching angle of a mobile robot, according to an exemplary embodiment of the present invention.

A camera among the diagnosis target modules included in the mobile robot in the present invention is diagnosed.

Referring to FIG. 6, the camera 22 is attached at one side of the mobile robot 1 according to the exemplary embodiment of the present invention and a marker 3 is attached to the base station 2 in which the mobile robot waits so that when the camera acquires images of the base station or the surroundings of the base station, the image includes the marker.

In the present exemplary embodiment, the diagnosis target module is a camera module and a command to cause the initialization operation to be performed includes a first command related to an operation to cause the mobile robot to at least temporally depart from the base station and a second command related to an operation to acquire an image of the base station or an image of the surrounding of the base station in a departing state according to the first command. The processor predicts a pose of the camera module by image analysis for the image acquired according to the second command.

Here, in a departing state according to the first command, an operation of acquiring the images of the base station or the surroundings of the base station allows the camera to acquire an image including the marker attached to the base station.

To this end, the processor of the mobile robot transmits a command to perform an operation of departing from the base station to the wheel. The mobile robot perform the operation of departing from the base station in response to the operation of the wheel.

Next, the camera mounted in the mobile robot acquires images related to the base station. The acquired image needs to include the marker of the baes station.

The processor of the mobile robot may easily predict the pose of the camera based on the acquired marker, mainly, a visual marker. The camera needs to be firmly attached to the mobile platform such as a body or a housing of the mobile robot.

A wheel or a tool may be provided on a front bottom at the front side of the mobile robot. However, a shape of the wheel or the tool may be deformed as time elapses. In this case, the condition that the wheel or the tool needs to be firmly attached may be broken. When the mobile robot is a cleaning robot in the present exemplary embodiment, the "tool" is a tool for cleaning and includes a main brush module or a side brush module for cleaning suction.

When the marker 3 attached to the base station is photographed by the camera 22 mounted in the platform, an image as illustrated in FIG. 7 may be acquired.

After acquiring the attitude of the camera with respect to the marker, inclination information of the platform may be acquired. Together with this, the inclination degree may be confirmed by confirming whether the marker is captured in a predetermined region.

Specifically, when the processor predicts the pose of the camera by analyzing the image acquired according to the second command, the attitude of the camera is predicted with respect to the marker included in the image acquired according to the second command and the inclination degree of the mobile robot is detected to dispose grids G1 and G2 with a predetermined interval in the image acquired according to the second command, check a location P in the grids where the marker is located to predict the attitude of the camera. Further, the inclination degree of the mobile robot is detected according to the intervals d1 and d2 between the grids and the location where the marker is located.

Referring to FIG. 7, in FIG. 7(a), the marker is detected in the location of the predetermined point (a center of the image and an intersection of the grids) so that it is considered as normal. However, as illustrated in FIGS. 7(b) and 7(c), when the inclination of the platform is obvious, a center point of the marker is deviated from a previously partitioned region so that the inclination is easily determined.

If the flatness of the floor is not guaranteed, a flexible plate is located on the floor to remove the error caused by the flatness as it will be described below.

Further, a quality of the image may be checked to diagnose the camera 22 among the diagnosis target modules included in the mobile robot designed as illustrated in FIG. 6.

[Image Quality]

When the quality of the image is deteriorated, there may be a problem in the position recognition or the object recognition so that it is necessary to check the quality of the image whenever there is an opportunity.

The camera of the mobile robot acquires an image including a marker. The processor of the mobile robot may check whether the marker image is acquired by means the image processing and when it is confirmed that the marker is included, determine that at least the camera system normally operates. In contrast, when the marker image is not acquired, the processor of the mobile robot may issue a warning message.

Specifically, after performing the second command related to the operation of acquiring the images of the base station or the surroundings of the base station in a departing state according to the first command, the processor determines whether the camera normally operates by checking the quality of the image acquired according to the second command.

Here, when the second command related to the operation of acquiring the images of the surroundings is performed, in a first operation, the marker is detected in a state vertically moving back from the base station, in a second operation, the camera or the platform rotates by 20 degrees to 30 degrees in a first direction to detect the marker, and in a third operation, the camera or the platform rotates by 20 degrees to 30 degrees in a second direction opposite to the first direction to detect the marker. When the marker is identified using the operations, it is determined that there is no problem in the camera system.

Here, the first direction and the second direction refer to rotating directions and indicate a clockwise direction and a counterclockwise direction.

When the marker is not recognizable, it is considered that foreign matters are attached on a camera lens and the task is not performed.

Here, when it is determined whether there is a problem in the camera by checking the quality of the acquired image according to the second command, it means that the marker is recognized from the image acquired according to the second command and when the marker is recognized, an average intensity of the acquired image is calculated. The calculated average intensity and a predetermined intensity reference value are compared to determine the problem of the camera. In order to calculate the average intensity of the acquired image, the image including the marker is divided and intensities of regions excluding the marker in the divided parts are measured to calculate the average intensity of the measured intensities.

Specifically, in order to provide additional information to a user to identify the problem, an average intensity of the captured image is measured. At this time, the image is divided into 4×4 or 8×8 to extract an average value.

When the average of each region deviates from the predetermined maximum/minimum values, it is notified that there may be a problem in the corresponding region. If the averages of all the regions deviate from the maximum value, it is notified that it is saturated or the camera is broken.

If the averages of all the regions deviate from the minimum value, it is notified that the camera is broken.

The above process may be understood as a method for recognizing the failure of the camera or an environment in which it is difficult for the camera to operate. Further, for the case in which the marker may be damaged or the marker cannot be stably detected, the marker is detected by the following process and the result is notified.

For example, when the marker is detected, an average intensity of a white region around the marker (up, down, left, and right) is obtained.

When the average is too high, it is requested to adjust a surrounding illuminance and when the average is too low, it is requested to increase the surrounding illuminance. When a specific region around the marker is dark or bright, it is notified that an illumination having a spot light effect enters the docking station so that the sensing performance may be deteriorated.

After measuring a frequency at which the marker is detected, when the frequency is lower than a predetermined frequency (for example, a camera imaging acquisition period), it is requested to check whether the marker is damaged.

A case that the marker is not detected will be described. A step of detecting the marker is generally classified into a step of detecting a shape (a rectangular or a circle), a step of extracting an ID, and a step of verifying.

If the shape is not detected, it is checked whether the maker is damaged. If the ID is not extracted, it is requested to check whether the marker is damaged and an illumination condition.

If the verification is not performed, it is requested to check whether the marker is damaged.

According to still another exemplary embodiment of the present invention, the marker may be implemented by a plurality of distinguishable sub regions. Sub areas having a predetermined size have different colors to evaluate alignment of a line of sight between the camera and the station. Specifically, when boundaries of the sub regions are located to a horizontal axis and a vertical axis, more delicate alignment is possible. A boundary region is desirably disposed to have a color to make a difference of pixel values before and after the boundary large so as to easily recognize an edge from the camera.

Figure 8:
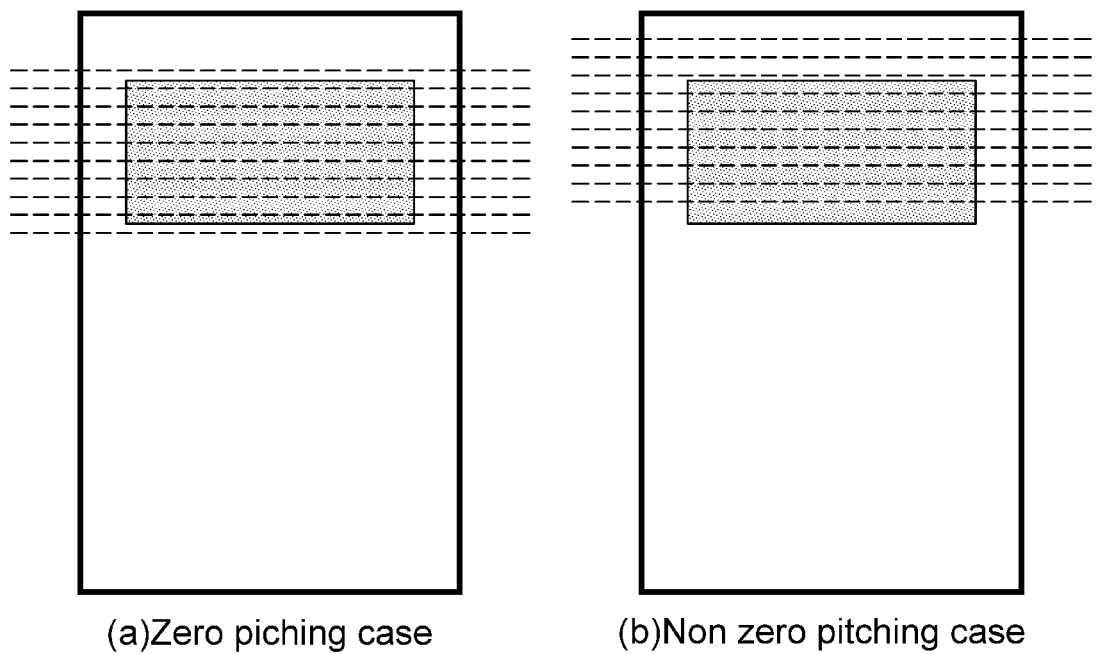
FIG. 8 is a front view of an example of predicting a pitching angle of a 3D Lidar sensor according to an exemplary embodiment of the present invention.
Figure 9:
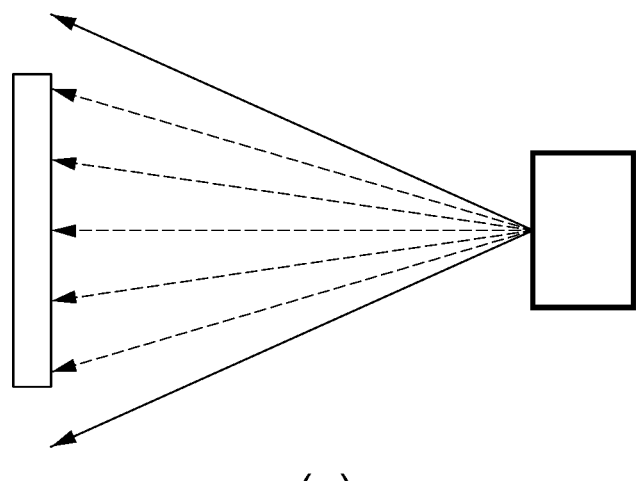
FIG. 9 is a side view of an example of predicting a pitching angle of a 3D Lidar sensor according to an exemplary embodiment of the present invention.
Figure 9:
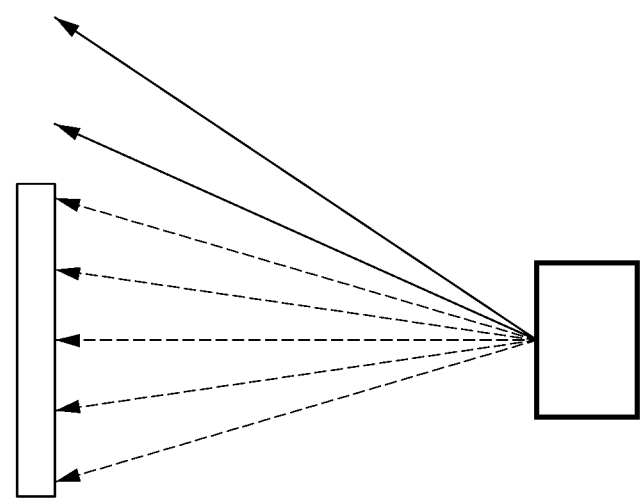

FIG. 8 is a front view of an example of predicting a pitching angle of a 3D radar sensor according to an exemplary embodiment of the present invention and FIG. 9 is a side view.

[Prediction of Pitching Angle in Three-Dimensional Lidar or Depth Camera]

A Lidar sensor among the diagnosis target modules included in the mobile robot in the present invention is diagnosed, which corresponds to the most basic diagnosis.

A 3D Lidar of the mobile robot performs a sweeping operation and initialization in consideration of the 3D Lidar which longitudinally sweeps will be described below.

In the present exemplary embodiment, the diagnosis target module is a Lidar module and specifically, a 3D Lidar. A command to cause the initialization operation to be performed includes a first command related to an operation to cause the mobile robot to at least temporally depart from the base station and a second command related to an operation to allow the 3D Lidar sensor to irradiate beam to the base station vertically or horizontally and receive the reflected beam in a departing state according to the first command. The processor predicts a pitching angle of the 3D Lidar sensor by means of the analysis on a Lidar image acquired according to the second command.

First, the processor of the mobile robot transmits a command to cause a step back operation to be performed. Here, the step back refers to an operation of allowing the mobile robot to move back from the base station.

Next, the processor of the mobile robot causes the Lidar sensor to perform "Lidar capture distance and intensity". It means that the Lidar sensor or a processor connected thereto measures a distance and an intensity from the marker having a retro-reflector.

Specifically, when the pitching angle of the Lidar module is predicted by analyzing the Lidar image acquired according to the second command, a beam reflected by the reflector according to the second command is received to measure the distance and the intensity from the initialization diagnosis marker to receive the distance and the intensity as the diagnosis acquisition information. The pitching angle is predicted with the initialization quality evaluation result value based on the distance and the intensity.

Similarly to the camera, the processor of the mobile robot already knows a position and a size of the marker in the base station so that it is possible to calculate a pose of the 3D Lidar with respect to the mobile platform.

Referring to FIG. 8 illustrating a front view, a right view (b) illustrates an example (non-zero pitching case) that some scanlines cannot see a marker (retro-reflector) generating a high intensity observation. A lower portion of the marker is not seen.

A left view (a) of FIG. 8 illustrates an example that a scan line is irradiated onto a marker attached to the base station (zero pitching case). Next, referring to FIGS. 9(a) and (b) illustrating side views, a scanning module of the 3D Lidar sensor may split the beam into a plurality of split beams to transmit. The pitching angle may vary depending on the degree of splitting.

According to still another exemplary embodiment of the present invention, desirably, the reflector having a retro-reflection performance is a "retro-reflective film". For example, a rotary 3D Lidar may include a light transmitting unit, a light receiving unit, a plate, and a rotary unit. The light transmitting unit irradiates laser onto a three-dimensional space and as illustrated in FIG. 9, the laser is incident onto the reflector. In order to precisely diagnose a rotary shaft alignment of the rotary 3D Lidar, it is desirable to dispose the retro-reflective film to have a directivity. Specifically, as the retro-reflective films, heterogeneous retro-reflective films having a band shape with a predetermined thickness may be alternately disposed with respect to a rotary shaft of the Lidar. Alternatively, an area having a retro-reflective film and an area which does not have a retro-reflective film may be alternately disposed. In the area having a retro-reflective film, an intensity of reflective light which is incident onto the light receiving unit is large but in the region which does not have a retro-reflective film, an intensity of the incident reflective light is small. By doing this, it is possible to precisely diagnose the rotation alignment of the 3D Lidar. Alternatively, when the retro-reflective film having a band shape is disposed in a reflection region, non-reflective regions may be disposed with a predetermined interval in one line. Further, when a heterogeneous retroreflective film is located at the outside of the region of the reflector, specifically, in the longitudinal outside, the alignment of a horizontal rotation angle of the laser may also be aligned.

Figure 10:
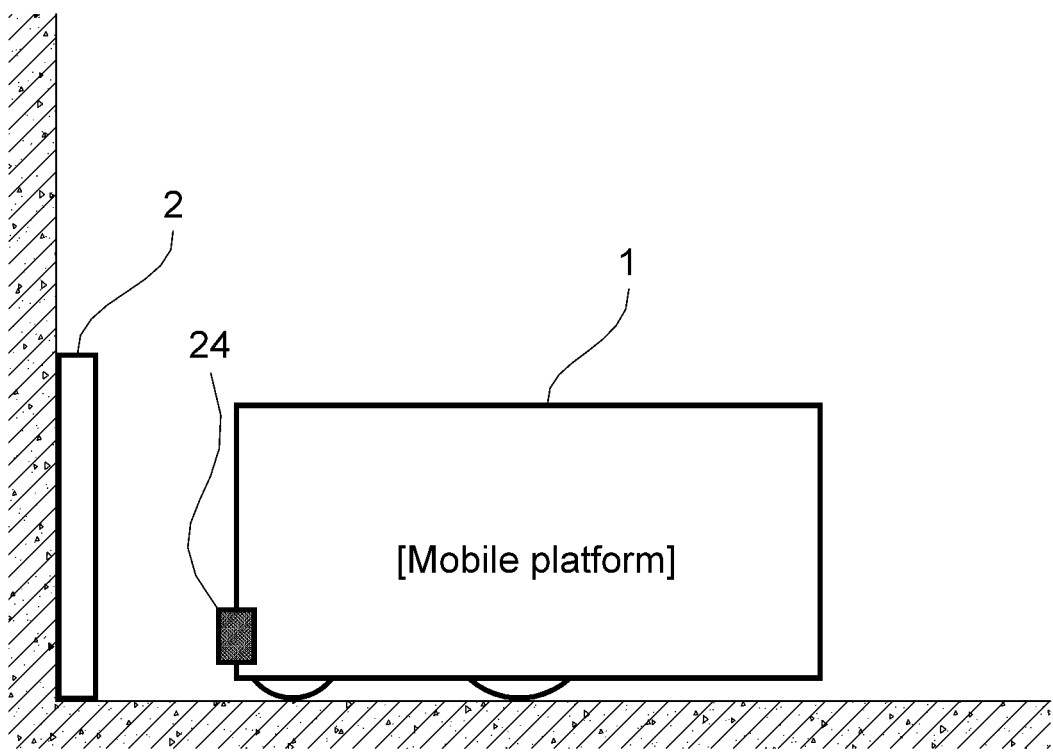
FIG. 10 illustrates an example of diagnosing a cliff sensor of a mobile robot according to an exemplary embodiment of the present invention.

FIG. 10 illustrates an example of diagnosing a cliff sensor of a mobile robot according to an exemplary embodiment of the present invention.

[Cliff Sensor, Distance Sensor]

A cliff sensor 24 among the diagnosis target modules included in the mobile robot in the present invention is diagnosed.

Referring to FIG. 10, in the mobile robot according to the exemplary embodiment of the present invention, the cliff sensor is attached on a surface facing the base station 2.

The cliff sensor or the distance sensor may measure a distance to the floor. For example, the cliff sensor may be a PSD sensor. An infrared sensor may be used as a proximity sensor.

When the diagnosis target module is at least one sensor including the cliff sensor and the distance sensor, a command to cause the initialization operation to be performed includes a first command related to an operation to allow the mobile robot to at least temporally depart from the base station and a second command related to an operation of performing an operation according to the first command and receiving a sensing value from the sensor. The processor compares the sensing value acquired according to the second command and a predetermined reference value to determine a failure.

In order to perform desirable initialization, it is assumed that there is no foreign substance on a floor adjacent to the base station. The processor of the mobile robot may diagnose an initial state of the mobile robot by means of the calculation using a distance value obtained from the cliff sensor or the distance sensor.

Specifically, a predicted average distance value obtained according to the calculation for the acquired distance value needs to be the same as a known value (according to a designed model). If the predicted average distance is not the same, the processor of the mobile robot may determine that there are foreign substances around the sensor or malfunction occurs.

A predicted deviation may be similar to an average deviation which is determined in advance in consideration of a specification of the sensor. If not, the processor of the mobile robot may suspect that there is a dust around the sensor. Further, the processor of the mobile robot may determine that malfunction or an electric problem occurs.

[Motor]

A motor among the diagnosis target modules included in the mobile robot in the present invention is diagnosed.

When the diagnosis target module is a motor included in the mobile robot, a command to cause the initialization operation to be performed includes a first command related to an operation to allow the mobile robot to at least temporally depart from the base station and a second command related to an operation of performing an operation according to the first command and receiving a measured current value flowing through the motor. The processor compares the measured current value of the motor detected according to the second command and a predetermined current reference value to determine a failure.

Here, it is desirable to evaluate the motor for driving the wheel of the mobile robot before performing a cleaning operation or another operation.

As an operation therefor, the processor of the mobile robot activates a sub system of a motor in a stop command state first.

Electrical information such as a current or a voltage may be obtained from a sub system of the motor by means of the electrical signal connected to the motor. The processor of the mobile robot may compare a predetermined reference value and the above-obtained information with regard to the motor system. The processor of the mobile robot may analyze a comparison result and sensor values of the other sensors to know whether an overcurrent currently flows through the motor and in some cases to know a cause of the overcurrent.

When there is an auxiliary device such as a docking station, it is controlled to move back by a predetermined distance by means of the command and during this process, the current flowing through the motor is confirmed. If the current is out of a predetermined maximum/minimum value, the failure is notified.

Further, after stopping, a distance between the docking station and the robot is measured using the distance sensor. When the distance deviates from a predetermined error value, the failure is notified and this process is repeated while advancing.

[Inertia Measurement Unit]

An inertia measurement unit IMU among the diagnosis target modules included in the mobile robot in the present invention is diagnosed.

The inertia measurement unit included in the mobile robot is a module for receiving attitude information of the mobile robot.

Roll, pitch, and yaw values of a mobile object are calculated with respect to a magnetic north which is the earth coordinate system. The IMU is a sensor which measures acceleration and a rotational motion and measures and records a velocity, a direction, and inertia of an object. Further, the IMU analyzes a position of the object. An AHRS is a device which measures an attitude and an orientation of the object and includes an acceleration sensor, a gyro sensor, and a magnetic sensor.

In addition, an attitude heading reference unit (AHRS) may be used to receive the attitude information of the mobile robot.

In the present exemplary embodiment, a scenario for diagnosing the inertia measurement unit (IMU) is performed by two types of diagnosing methods.

First, when the diagnosis target module is the inertia measurement unit (IMU) which measures the acceleration of the mobile robot, a command to cause the initialization operation to be performed includes a first command related to an operation of allowing the mobile robot to at least temporally depart from the base station and a second command related to an operation of performing an operation according to the first command and receiving a measured acceleration value from the inertial measurement unit (IMU) module as the diagnosis acquisition information. The processor calculates a deviation obtained by comparing the measured acceleration value received according to the second command and a predetermined acceleration reference value as the initialization quality evaluation result value to determine the failure of the signal.

Most IMU observation information obtained by the IMU applied to the mobile robot may include uncertainty. This means that the IMU does not require a large amount of bias. When a large deviation from an initially corrected value in the manufacturing factory occurs, the processor of the mobile robot needs to transmit a warning alarm message to the user.

The processor of the mobile robot checks all values obtained from the IMU first, for example, an angular velocity and an acceleration value. At this time, the measurement frequency is checked and if the measurement frequency departs from a predetermined sampling rate, the failure is notified.

Next, a change in a wheel encoder is checked. As a checking result, when a current situation of the mobile robot is stable, there is no large deviation in each value so that the processor of the mobile robot stores the corresponding values.

The processor of the mobile robot calculates an average and a standard deviation of acquired values of the IMU. In a normal situation, these values are within a range of the predetermined reference value.

The reference value will be described. When the mobile robot stops, all outputs of the gyro need to be close to zero and as an output of the acceleration sensor, an inertial acceleration in a predetermined direction according to an installation angle needs to be measured.

The above-described case is a process of checking a problem of a raw signal and when there is a movement, the failure is diagnosed from a value obtained after processing the raw signal.

Next, when the diagnosis target module is the inertia measurement unit (IMU) module which measures the acceleration of the mobile robot, a command to cause the initialization operation to be performed includes a first command related to an operation of allowing the mobile robot to at least temporally depart from the base station and a second command related to an operation of receiving a measured relative angle value measured by rotating the camera module or the Lidar module in a predetermined direction in a departing state according to the first command as the diagnosis acquisition information. The processor calculates an error obtained by comparing the measured relative angle value received according to the second command and a predetermined relative angle reference value as the initialization quality evaluation result value to determine the failure of the signal.

Specifically, when there is movement, a relative angle of the robot with respect to the docking is extracted and when the camera is used, the marker of the docking station may be used.

When the Lidar is used, an angle of the wall surface may be used to be inferred and a relative angle is extracted using the above-described method after one left turn. At this time, angles before/after rotation need to match. Angles which do not match are considered as an error of the IMU.

Next, a relative angle is extracted after one right turn again and at this time, the angles before/after rotation need to match. Angles which do not match are considered as an error of the IMU.

After checking a relative error in each direction, when the error is large enough to deviate from a predetermined value, the failure is notified. By means of this process, a potential failure of software which processes a raw signal, an attachment position, or a raw signal is predicted.

Thereafter, an initialization quality evaluation result value indicating the initialization quality of the diagnosis target module is calculated and a response operation according to the initialization quality evaluation result value is executed, using a task mission to be performed by the mobile robot and the diagnosis acquisition information.

The response operation includes an operation of correcting a reference value of the diagnosis target module or correcting a scale factor to reduce an error. A method for correcting an inertial measurement unit (IMU) among the diagnosis target modules included in the mobile robot in the present invention will be described. First, when the response operation according to the initialization quality evaluation result value is performed by a first correcting method, the processor calculates a deviation obtained by comparing the measured acceleration value received according to the second command and the predetermined acceleration reference value as the initialization quality evaluation result value. At this time, when the signal is normal, the acceleration reference value is corrected with the measured acceleration value.

Specifically, a motor is turned off and it is confirmed that there is no change in an encoder, and each raw signal is checked, and then a stdev is calculated to store a normal noise state. A software module which obtains an attitude (heading) of the robot using the raw signal reads this value to use and is very useful to know a noise characteristic of the sensor, like a Kalman filter.

Further, the angle may be obtained using a software module which obtains an attitude of the robot and this angle value may have a minute scale factor error sometimes. In order to correct this error, the scale factor is adjusted after turning to the left/right.

Accordingly, when the response operation according to the initialization quality evaluation result value is performed by a second correcting method, the processor calculates an error obtained by a measured relative angle value received according to the second command and the predetermined relative angle reference value as the initialization quality evaluation result value to inversely calculate the scale factor for reducing the error to correct the error.

Specifically, a relative angle of the robot with respect to the docking is extracted. When the camera is used, the marker of the docking station is used and when the Lidar is used, the inference is performed using the angle of the wall surface.

The relative angle is extracted using the above method after one left-turn and at this time, angles before/after the turn need to match. Angles which do not match are considered as an error of the IMU.

Thereafter, the relative angle is extracted after one right turn again.

In the case of the second correcting method, angles before/after the turn need to match. Angles which do not match are considered as an error of the IMU. A scale factor required to make the error zero is inversely calculated to be provided to the software module.

In addition, a third correcting method will be described. When the robot is initialized at the docking, a variation of the angle per second is checked before step-back to check whether there is drift.

When the drift occurs, a gyro sensor is initialized and a variation is checked again for four seconds.

For example, in the case of RX2 which uses Bosch gyro, when the drift for 0.1 or more (necessary to check a precise value) per second for four seconds, it is determined that there is a problem and the gyro is reset.

When it is determined that the drift does not occur, the initialization is continued after step-back from the base station.

[Various Sensors]

The processor of the mobile robot reads sensor data from all sensors. The read sensor data and previously defined values are compared. A bump may perform an operation of intentionally bumping into the base station for double check.

Here, sensors includes an infrared sensor or an ultrasound sensor for sensing proximate obstacles, an infrared sensor for sensing proximity to the floor, a wheel displacement sensor for sensing the displacement of a wheel or a contact sensor. Further, as a bumper sensor located in the bumper of the mobile robot, sensors for detecting front obstacles may be provided.

For example, the distance sensor is stepped back from the docking station by approximately one meter and measures a distance from the docking station using the distance sensor. When there is a distance error, the failure is notified.

The above-described process is performed for every sensor (in the case of the ultrasound sensor, rotation to the front direction is necessary). Since it is already known that the IMU error is very low, it is assumed that the sensor is precisely directed to the docking station.

Figure 11:
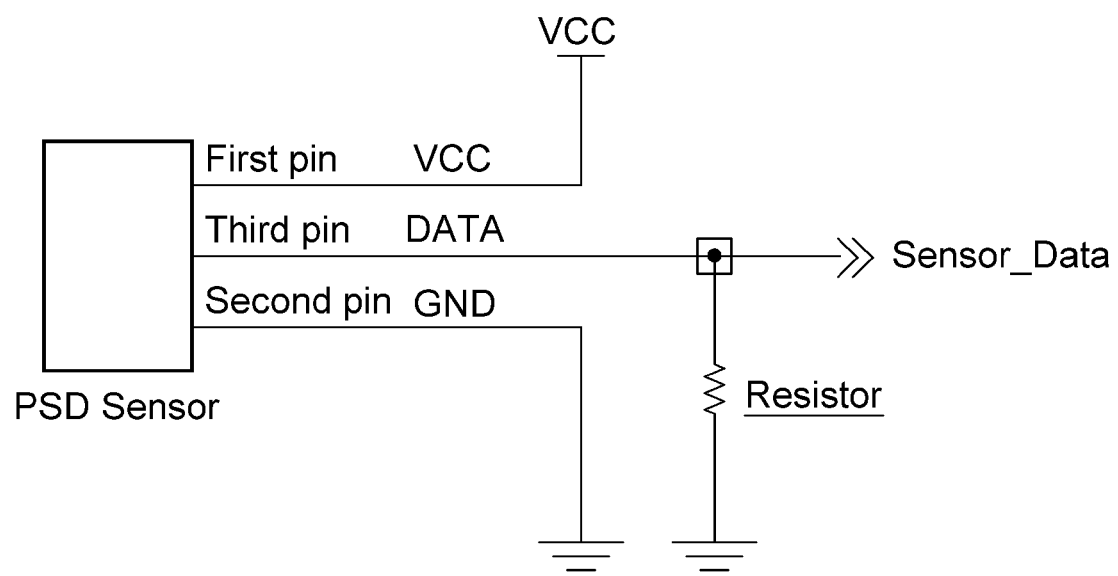
FIG. 11 illustrates an example of diagnosing a distance detecting sensor of a mobile robot according to an exemplary embodiment of the present invention.

FIG. 11 illustrates an example of diagnosing a distance detecting sensor of a mobile robot according to an exemplary embodiment of the present invention.

In the present exemplary embodiment, the distance measurement sensor may transmit and receive an infrared ray to recognize a distance in accordance with a measured intensity of light. The intensity of light is compared with a reference value to determine whether it is a cliff.

The distance measurement sensor transmits an infrared ray and recognizes a distance in accordance with a position of light measured in a reflector array according to a reflection angle. The distance measurement sensor may measure a distance within a sensing zone range in accordance with a ratio between a maximum width of the reflector array and a position where the received light is detected. That is, the receiver may be implemented by a position sensitive device (PSD).

When the distance measurement sensor or the cliff recognizing sensor erroneously operates, wrong distance information is output. An erroneous operation type of the distance measurement sensor is classified into (i) a type of measuring an abnormal distance because a foreign substance is inserted or blocks a front side through which the sensor transmits/receives light and (ii) a type of causing a cable short because a foreign substance is inserted between the sensor and a control board in the cleaning robot.

The distance measurement sensor according to the present embodiment analyzes output data of the sensor to detect an error state in which the distance measurement sensor erroneously operates, based on a degree of dispersion or a representative value of the data.

FIG. 11 is a circuit diagram illustrating a distance detecting sensor according to exemplary embodiments of the present invention. Referring to FIG. 11, in order to immediately change data when a data line of the distance measurement sensor is shorted to a power voltage or a ground, the data line of the distance measurement sensor is connected to the ground via a resistor. The controller compares a representative value of the data which is changed during the detection time with a first short state threshold and/or a second short state threshold to detect an abnormal state. The controller compares a representative value of the data which is changed during the detection time with a predetermined first short state threshold and/or a predetermined second short state threshold to detect a state in which some of circuits of the distance measurement sensor is shorted.

In a fourth error state, the data line is shorted to the power voltage. When the first pin and the third pin are shorted, the controller receives an electrical signal with a value within a predetermined range with respect to the predetermined first short state threshold within the detection time.

The first short state threshold is set using a voltage value or a current value of data communication measured in a state in which the power voltage is connected to the data communication and the data communication is connected to the ground via the resistor. When the representative value is a value within a predetermined range with respect to the first short state threshold, the controller recognizes that the first pin and the third pin are shorted.

In a fifth error state, the data line is shorted to the ground. When the second pin and the third pin are shorted, the controller receives an electrical signal with a value within a predetermined range with respect to the predetermined second short state threshold within the detection time.

The second short state threshold is set using a voltage value or a current value of data communication measured in a state in which the ground is directly connected to the data communication and the data communication is further connected to the ground via the resistor. When the representative value is a value within a predetermined range with respect to the second short state threshold, the controller recognizes that the second pin and the third pin are shorted.

When it is assumed that the first short state threshold and the second short state threshold are set with respect to the voltage level, the first short state threshold set to a value close to the power voltage is set to be larger than the second short state threshold set to be close to the ground voltage. When the first short state threshold and the second short state threshold are set with respect to the current level, the magnitude relationship between the first short state threshold and the second short state threshold may be set to be opposite to the voltage level.

The second threshold set with respect to the voltage level is a threshold regarding the representative value of the data and the second short state threshold is a threshold regarding the representative value of the data. The second threshold and the second short state threshold may be set to have the same or similar value.

For example, the second threshold is set to be 10 and the second short state threshold is set to be 10.

In order to distinguish that the cliff is recognized to be normal, when a condition that continuously recognizes an abnormal state during a state determining time, during a detection time, or after an avoidance operation is satisfied, the distance measurement sensor according to the present exemplary embodiment substantially confirms that it is an abnormal state.

[Battery]

The processor of the mobile robot reads all sensor data related to the battery. With regard to the battery, the read sensor data and predetermined values are compared. Specifically, when a capacity of the battery is lower than a reference value, it is necessary to provide a message regarding the low power to the user.

[Environment Sensing]

A temperature and a humidity in the vicinity of the mobile robot may be checked. When there is a situation in that any operation cannot be performed, the mobile robot may not appropriately operate so that it is important.

Thereafter, after the processor determines an abnormal state, the predetermined reference value is corrected using the sensing value.

Figure 12:
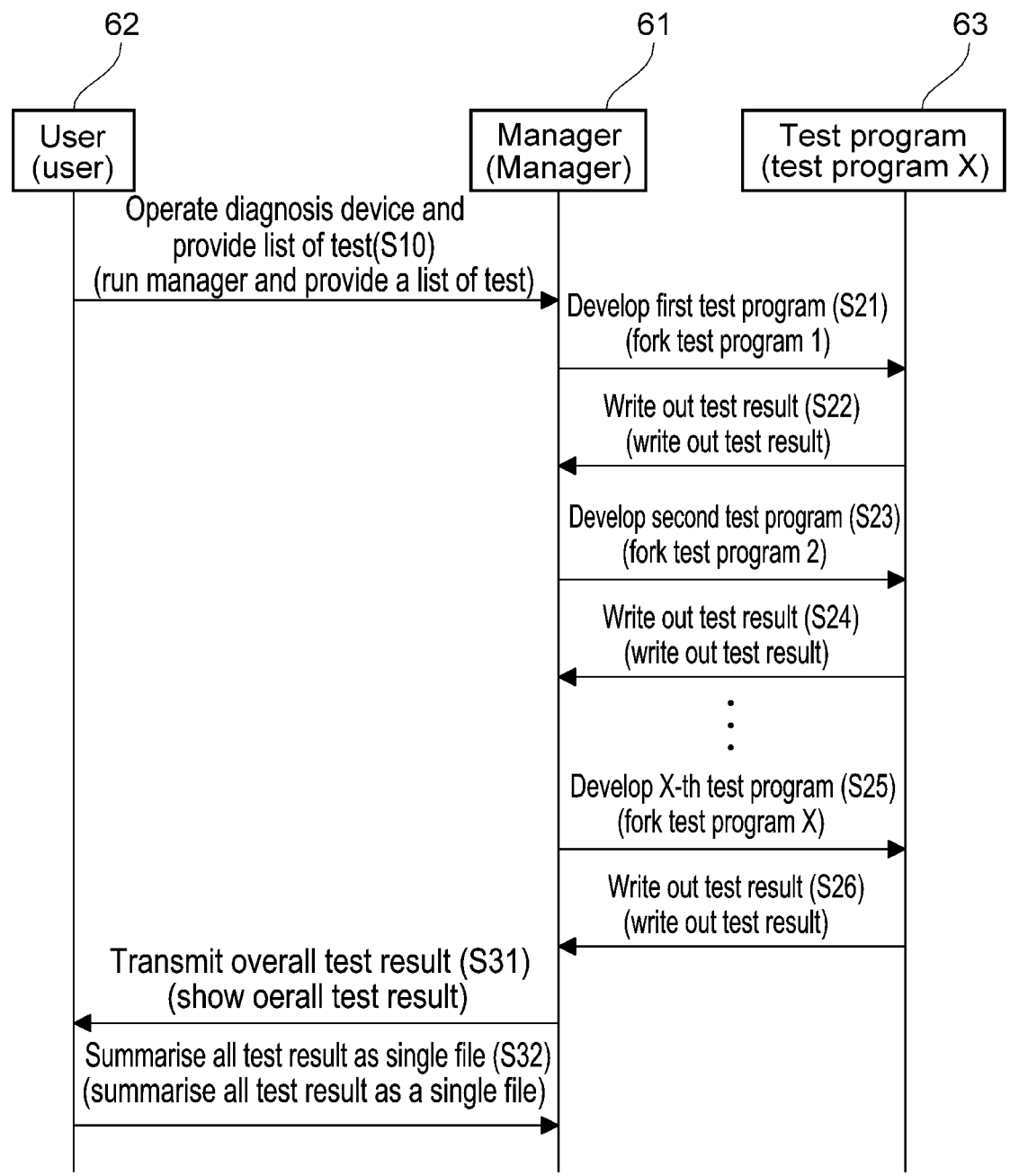

FIGS. 12 to 14 illustrate a failure diagnosis method of a mobile robot using an integrated UI, according to an exemplary embodiment of the present invention.

In the present invention, a structure is designed to implement a distributed system so that a failure diagnosis program manufactured by a control engineer may be easily added to an integrated UI (manager) in the future.

Referring to FIG. 12, in step S10, the manager (integrated UI) 61 is supplied with a diagnosis device operating and test list from a user 62.

Next, in step S21, the manager develops a first test program and in step S22, writes out a test result using a test program 63. Next, in step S23, the manager develops a second test program and in step S24, writes out a test result using the test program 63. Repeatedly, in step S25, the manager develops an X-th test program and in step S26, writes out a test result using the test program 63.

Specifically, an individual failure diagnosis program is made to have a int main( ) structure to be an independent execution file and the integrated UI (manager) creates individual programs such as sword_launcher by a folk process, as a child. However, unlike sword_launcher, the manager sequentially executes the program.

When the child completes the diagnosis, the result is stored as a j son file and the process ends.

When the result is stored as a Json file, the user easily sees the result and parsing is easy to create a system for correcting the sensor later.

Next, a test program is called as a new child.

Second to fourth patterns are repeated until a processTable is empty.

In step S31, an overall test result is transmitted to the user and in step S32, a test result summary file is stored.

Specifically, when all the tests end, the manager shows an overall diagnosis result to the terminal and waits for the response of the user. When the user wants to store the result as a file, j son files created in the third process are combined as a single file to be stored.

Finally, the manager provides an overview of the test results through the terminal. Further, items failed during an inspection process are listed-up.

FIG. 13 is a program for diagnosing a motor of a mobile robot and FIG. 14 is a view illustrating that a communication state with hardware is checked by a Ping command.

As described above, checking, diagnosis, and correcting if necessary of various sensors, a pitching value related to a camera, and image quality values which need to be checked when the mobile robot is woke up may be implemented in the form of a software program executable in a processor of the mobile robot and the above-described operations may be implemented to be directly performed by the above-described various modules.

According to still another exemplary embodiment of the present invention, the present invention may be implemented in the form of a mobile robot provided to implement software for performing the initialization diagnosis and correction method. To this end, the mobile robot may further include a memory for non-transitorily or transitorily storing a software of performing the initialization diagnosis and correction method. In this case, the processor generates commands to execute a routine of a diagnosis operation by an operation according to a diagnosis and correction routine stored in a memory and transmits the command to the diagnosis target module. Accordingly, the diagnosis target module perform the operation according to the above-mentioned command and transmits data obtained as the operation is performed to the processor. The processor diagnoses an initialization state by analyzing the transmitted data and when the error is larger than a reference value as a result of a necessary calculation, performs the initial correction on a parameter related to the initialization.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit of the present invention is not limited by the exemplary embodiments and accompanying drawings. The protection scope of the present invention should be interpreted based on the following appended claims and it should be appreciated that all technical spirits included within a range equivalent thereto are included in the protection scope of the present invention.

The invention claimed is:

1. An initialization diagnosis method of a mobile robot, comprising:

allowing at least one processor included in the mobile robot to execute an initialization diagnosis command to perform an initialization operation required to determine an initialization quality when a diagnosis target module transitions from an idle state to a wake-up state;

receiving diagnosis acquisition information including a response according to the initialization diagnosis command in the wake-up state of the diagnosis target module; and calculating an initialization quality evaluation result value indicating the initialization quality of the diagnosis target module using a task mission to be performed by the mobile robot and the diagnosis acquisition information and executing a response operation according to the initialization quality evaluation result value, wherein a data line of a distance measurement sensor included in the mobile robot is connected to a ground via a resistor, wherein a first short state threshold is set as a voltage value or a current value of the data line measured in a state in which a power voltage is connected to the data line, and a second short state threshold is set as a voltage value or a current value of the data line measured in a state in which the ground is directly connected to the data line, wherein a controller recognizes that the data line is shorted to the power voltage if a representative value of a voltage value or a current value of the data line changed during a detection time is a value within a predetermined range with respect to the first short state threshold, and recognizes that the data line is shorted to the ground if the representative value is a value within a predetermined range with respect to the second short state threshold, and wherein the controller detects a cable short abnormal state of the distance measurement sensor if the controller recognizes that the data line is shorted to the power voltage or that the data line is shorted to the ground.

2. The initialization diagnosis method of claim 1, wherein the state transition of the diagnosis target module is performed within a predetermined distance from a base station where the mobile robot is charged or the mobile robot stops in the idle state to be located and the initialization quality is related to erroneous operation causing factors which correct driving factors related to the autonomous driving of the mobile robot or cause the erroneous operation of the mobile robot.

3. The initialization diagnosis method of claim 2, wherein the base station includes an initialization diagnosis marker including a reflector which reflects at least some of incident optical signals again to be identifiable by a camera module or a Lidar module and by an operation of acquiring images of the base station or surroundings of the base station according to the initialization diagnosis command, an image including the initialization diagnosis marker attached to the base station is acquired.

4. The initialization diagnosis method of claim 3, wherein the diagnosis target module is the camera module and the command to cause the initialization operation to be performed includes a first command related to an operation to cause the mobile robot to at least temporally depart from the base station and a second command related to an operation to acquire an image of the base station or an image of the surrounding of the base station in a departing state according to the first command, and the processor predicts a pose of the camera module by image analysis on the image acquired according to the second command.

5. The initialization diagnosis method of claim 3, wherein the diagnosis target module is the Lidar module and the command to cause the initialization operation to be performed includes a first command related to an operation to cause the mobile robot to at least temporally depart from the base station and a second command related to an operation to allow the Lidar module to irradiate beam vertically or horizontally to the base station and receive the reflected beam in a departing state according to the first command and the processor predicts a pitching angle of the Lidar module by means of the analysis on the Lidar image acquired according to the second command.

6. The initialization diagnosis method of claim 5, wherein when the pitching angle of the Lidar module is predicted by analyzing the Lidar image acquired according to the second command, a beam reflected by the reflector according to the second command is received to measure the distance and the intensity from the initialization diagnosis marker to receive the distance and the intensity as the diagnosis acquisition information and the pitching angle is predicted with the initialization quality evaluation result value based on the distance and the intensity.

7. The initialization diagnosis method of claim 1, wherein the diagnosis target module is an inertia measurement unit (IMU) which measures an acceleration of the mobile robot, a command to cause the initialization operation to be performed includes a first command related to an operation of allowing the mobile robot to at least temporally depart from the base station and a second command related to an operation of performing an operation according to the first command and receiving a measured acceleration value from the inertial measurement unit (IMU) module as the diagnosis acquisition information and the processor calculates a deviation obtained by comparing the measured acceleration value received according to the second command and a predetermined acceleration reference value as the initialization quality evaluation result value to determine the failure of the signal.

8. The initialization diagnosis method of claim 3, wherein the diagnosis target module is an inertia measurement unit (IMU) module which measures the acceleration of the mobile robot, a command to cause the initialization operation to be performed includes a first command related to an operation of allowing the mobile robot to at least temporally depart from the base station and a second command related to an operation of receiving a measured relative angle value measured by rotating the camera module or the Lidar module in a predetermined direction in a departing state according to the first command as the diagnosis acquisition information, and the processor calculates an error obtained by comparing the measured relative angle value received according to the second command and a predetermined relative angle reference value as the initialization quality evaluation result value to determine the failure of the signal.

9. The initialization diagnosis method of claim 7, wherein when the response operation according to the initialization quality evaluation result value is performed, the processor calculates a deviation obtained by comparing a measured acceleration value received according to the second command and a predetermined acceleration reference value as the initialization quality evaluation result value and at this time, when a signal is normal, corrects the acceleration reference value with the measured acceleration value.

10. The initialization diagnosis method of claim 8, wherein when the response operation according to the initialization quality evaluation result value is executed, the processor calculates a deviation obtained by comparing the measured relative angle received according to the second command and the predetermined relative angle reference value as the initialization quality evaluation result value to inversely calculate a scale factor for reducing the error to correct the error.

11. An initialization diagnosis system of a mobile robot, comprising:
a base station in which the mobile robot is charged or the mobile robot stops in an idle state to be located;
a passive initialization reference providing unit which is located in the base station and provides a reference for initializing the mobile robot; and
an initialization diagnosis processor which generates an initialization diagnosis command to perform an initialization operation required to determine an initialization quality according to a state transition of the diagnosis target module included in the mobile robot from an idle state to a wake-up state, receives diagnosis acquisition information including a response according to the initialization diagnosis command in the wake-up state of the diagnosis target module, calculates the initialization quality result value indicating an initialization quality of the diagnosis target module using a task mission to be performed by the mobile robot and the diagnosis acquisition information, and executes the response operation according to the initialization quality evaluation result value, wherein a data line of a distance measurement sensor included in the mobile robot is connected to a ground via a resistor, wherein a first short state threshold is set as a voltage value or a current value of the data line measured in a state in which a power voltage is connected to the data line, and a second short state threshold is set as a voltage value or a current value of the data line measured in a state in which the ground is directly connected to the data line, wherein a controller recognizes that the data line is shorted to the power voltage if a representative value of a voltage value or a current value of the data line changed during a detection time is a value within a predetermined range with respect to the first short state threshold, and recognizes that the data line is shorted to the ground if the representative value is a value within a predetermined range with respect to the second short state threshold, and wherein the controller detects a cable short abnormal state of the distance measurement sensor if the controller recognizes that the data line is shorted to the power voltage or that the data line is shorted to the ground.

12. The initialization diagnosis system of claim 11, wherein the passive initialization reference providing unit includes:

i) an initialization diagnosis marker which is identifiable by a camera module or a Lidar module equipped in the mobile robot facing the base station; or ii) a marker which is identifiable by the camera module or the Lidar module equipped in the mobile robot facing the base station; and an initialization reference wheel plate which is located such that a wheel of the mobile robot is in contact therewith to allow the mobile robot to recognize the marker while the mobile robot moves.

13. The initialization diagnosis system of claim 12, wherein the initialization diagnosis marker further includes a reflector which reflects at least some of incident optical signals again and the reflector has a pattern in a direction corresponding to a horizontal operation direction of the camera module or the Lidar module equipped in the mobile robot.

14. The initialization diagnosis system of claim 12, wherein the initialization diagnosis maker further includes a reflector which reflects at least some of incident optical signals again and the reflector is recognized by the camera module or the Lidar module equipped in the mobile robot and is disposed so as to be differently recognized according to a three-dimensional positional relationship with the mobile robot.

15. The initialization diagnosis system of claim 11, wherein the diagnosis target module is a Lidar module and a command to cause the initialization operation to be performed includes a first command related to an operation to cause the mobile robot to at least temporally depart from the base station and a second command related to an operation to allow the Lidar module to irradiate beam vertically or horizontally to the base station and receive the reflected beam in a departing state according to the first command and the initialization diagnosis processor predicts a pitching angle of the Lidar module by the analysis of the Lidar image acquired according to the second command.

* * * * *